United States Patent
Wu et al.

(10) Patent No.: US 11,535,540 B2
(45) Date of Patent: Dec. 27, 2022

(54) DOUBLE-TANK OXIDATION POND REACTOR FOR EVALUATING OZONE CATALYTIC OXIDATION EFFICIENCY

(71) Applicant: SOOCHOW UNIVERSITY, Suzhou (CN)

(72) Inventors: Duo Wu, Suzhou (CN); Zhenkai Liao, Suzhou (CN); Xingmin Gao, Suzhou (CN); Zhangxiong Wu, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 139 days.

(21) Appl. No.: 16/957,471

(22) PCT Filed: Jan. 4, 2018

(86) PCT No.: PCT/CN2018/071342
§ 371 (c)(1),
(2) Date: Jun. 24, 2020

(87) PCT Pub. No.: WO2019/127631
PCT Pub. Date: Jul. 4, 2019

(65) Prior Publication Data
US 2021/0070639 A1    Mar. 11, 2021

(30) Foreign Application Priority Data
Dec. 27, 2017   (CN) .......................... 201711445606.6

(51) Int. Cl.
C02F 1/78   (2006.01)
C02F 1/72   (2006.01)
C02F 1/00   (2006.01)

(52) U.S. Cl.
CPC .............. *C02F 1/725* (2013.01); *C02F 1/006* (2013.01); *C02F 1/78* (2013.01); *C02F 2201/005* (2013.01); *C02F 2201/784* (2013.01)

(58) Field of Classification Search
CPC combination set(s) only.
See application file for complete search history.

(56) References Cited

FOREIGN PATENT DOCUMENTS

| CN | 104211160 A | | 12/2014 |
|---|---|---|---|
| CN | 105879581 A | * | 8/2016 |
| CN | 205710048 U | | 11/2016 |
| CN | 206447632 U | | 8/2017 |
| JP | 2007136351 A | | 6/2007 |

* cited by examiner

*Primary Examiner* — Cameron J Allen
(74) *Attorney, Agent, or Firm* — SZDC Law P.C.

(57) ABSTRACT

The invention discloses a double-tank oxidation pond for evaluating catalytic ozonation efficiency, comprising detachable tank bodies made of organic glass, movable ozone aeration pipes and sampling holes. Each tank body has three sections. The height of ozone aeration tube and the number of the holes can be adjusted. The holes are distributed at different positions of the tank bodies for real-time in-situ sampling. It is easy to observe the distribution profile of the gas, liquid and solid phases in the tank bodies. The square double-tank structure is similar to actual production process, and thus the experimental data is easy for computer simulation to enlarge to the actual production process. The size of the ozone aeration pipe and the position of holes in the tank can be adjusted to evaluate the catalytic ozonation effect of sewage treated by different aeration ways and aeration heights.

10 Claims, 6 Drawing Sheets

US 11,535,540 B2

DOUBLE-TANK OXIDATION POND REACTOR FOR EVALUATING OZONE CATALYTIC OXIDATION EFFICIENCY

This application is the National Stage Application of PCT/CN2018/071342, filed on Jan. 4, 2018, which claims priority to Chinese Patent Application No. 201711445606.6, filed on Dec. 27, 2017, which is incorporated by reference for all purposes as if fully set forth herein.

FIELD OF THE INVENTION

The invention relates to an oxidation pond, in particular to a double-tank oxidation pond for evaluating catalytic ozonation efficiency.

DESCRIPTION OF THE RELATED ART

Catalytic ozonation, as an effective method for removing organic matter from wastewater, is widely used in wastewater treatment. In the process of sewage treatment, catalytic ozonation is a three-phase reaction of gas-liquid-solid (ozone, sewage and catalyst), which is a relatively complicated process, and thus the effect of catalytic ozonation of sewage is determined by various factors, such as ozone flow rate, aeration method, bubble size, catalyst size, filling volume, sewage flow rate, etc. For large sewage treatment plants, some data are needed to guide production. Since it is not possible to collect data experimentally in large and medium-sized equipment, some small test equipment is needed to evaluate the efficiency of catalytic ozonation of sewage.

At present, there are three main types of devices for evaluating catalytic ozonation efficiency for sewage: the first one is a single tank without circulation, in which the catalyst and sewage are placed in the tank with ozone introduced from the bottom of the tank and escaped from the top of the tank; the second one is a single tank with circulation, in which a certain amount of catalyst is filled in the tank with ozone introduced from the bottom of the tank and escaped from the top of the tank, while the sewage is pumped from the bottom to the top of the tank to realize the sewage circulation in the tank; and the third one is a continuous single tank, in which the catalyst is filled into the tank, and the sewage continuously flows into the tank from the bottom (or top) of the tank and then flows out from the top (or bottom) of the tank. These devices have the following shortcomings: first, the ozone aeration way and position are fixed and substantially can not be adjusted; second, the position of the water inlet and outlet cannot be adjusted; third, the sampling can only be performed at the water inlet and outlet of the tank, and it can not be performed at different positions of the tank, so the only difference we can observe is between the water flowing in and flowing out of the tank but cannot figure out what occurs in the tank; four, the tanks are mostly a round single tank, but a square double-tank is mostly used in actual production.

SUMMARY OF THE INVENTION

In order to solve the above technical problems, the object of the present invention is to provide a double-tank oxidation pond for evaluating catalytic ozonation efficiency, in which the aeration mode and the aeration position can be adjusted, real-time sampling at multiple points and multiple positions are achieved, which is close to actual production and is convenient for computer simulation amplification.

The invention provides a double-tank oxidation pond for evaluating catalytic ozonation efficiency, which includes a tank body A and a tank body B, a base, water inlets, water inlet pipes, water outlets, water outlet pipes, sampling needles, an ozone aeration pipe and a communication pipe. The tank body A and the tank body B are independent from each other, and are fixed and spaced on the base side by side. The water inlets are provided on the tank body A, and the water inlet pipes are detachably connected to the water inlets. The water outlets are provided on the tank body B, and the water outlet pipes are connected to the water outlets. Sampling holes are opened on the tank body A and the tank body B respectively, and the sampling needles are removably plugged to the sampling holes. Gas inlet pipe openings are opened on a wall of each of the tank body A and the tank body B; and the ozone aeration pipes are detachably inserted to the gas inlet pipe openings. The communication pipe is connected between the tank body A and the tank body B, and each of the tank body A and the tank body B is provided with a filler supported overflow sieve plate at an inner lower end thereof.

Preferably, the tank body A is formed by connecting three tank body sections in the vertical direction by a first flange, the tank body B is formed by connecting three tank body sections in the vertical direction by a second flange. The tank body A has a cross-sectional area as twice as that of the tank body B, and the tank body A and the tank body B has the same height and are connected by an upper beam and a lower beam.

Preferably, the tank body A and the tank body B are both made of organic glass, and a drain pipe having a first valve is provided at the bottom of the tank body A.

Preferably, three water inlets are distributed at the upper, middle and lower parts of the tank body A and spaced apart from each other, and three water outlets are distributed at the upper, middle and lower parts of the tank body B and spaced apart from each other, and the water outlet pipe is provided with a second valve.

Preferably, the sampling holes on the tank body A are evenly spaced and distributed in the middle portions of the front face and the side face of the tank body A from bottom to top, and the sampling holes on the tank body B are evenly spaced and distributed in the left edge and the middle portion of the front face of the tank body B from bottom to top.

Preferably, the sampling hole comprises a stepped round hole, a silicone ball with a pinhole and a third flange; the silicone ball with a pinhole is placed on the stepped round hole and is pressed by the third flange.

Preferably, the ozone aeration pipe is supported by four supporting blocks, each supporting block is fixedly connected to a screw hole in the tank body via a screw.

Preferably, the ozone aeration pipe comprises a gas intake manifold and five branch pipes, the gas intake manifold is detachably inserted in the gas inlet pipe opening, the gas intake manifold and the gas inlet pipe opening are sealed by a first O-ring, and the five branch pipes are connected to each other in a shape of the Chinese character "日", wherein one of the five branch pipes is connected to the gas intake manifold and sealed at the connection position by a second O-ring, and the five branch pipes have at least four aeration holes which are oriented downward and at an angle of 45° to the vertical direction.

Preferably, the communication pipe is connected between the bottoms of the tank body A and the tank body B and is provided with a third valve.

Preferably, the filler supported overflow sieve plate has elongated slots thereon, and each filler supported overflow sieve plate is supported in the tank body A and the tank body B by uprights at the four corners thereof.

By means of the above technical solutions, the present invention has the following advantages: the distribution of the gas, liquid and solid phases can be observed conveniently in the double-tank oxidation pond for evaluating catalytic ozonation efficiency; the double-tank is designed as square tank bodies, which is close to actual production process, and thus the resulting experimental data is easy for computer simulation to enlarge to the actual production process. The size of the ozone aeration pipes and the position of the holes on the tank bodies can be adjusted to evaluate the catalytic ozonation effect of sewage for different aeration ways and aeration heights, and real-time sampling can be performed simultaneously at different positions of the tank bodies.

The above description is only an overview of the technical solutions of the present invention. In order to illustrate the technical means of the present invention more clearly and implement the technical solutions in accordance with the specification, the preferred embodiments of the invention are described hereinafter in more detail by reference to the accompanying drawings.

DETAILED DESCRIPTION OF THE PREFERRED EMBODIMENTS

Figure 1:
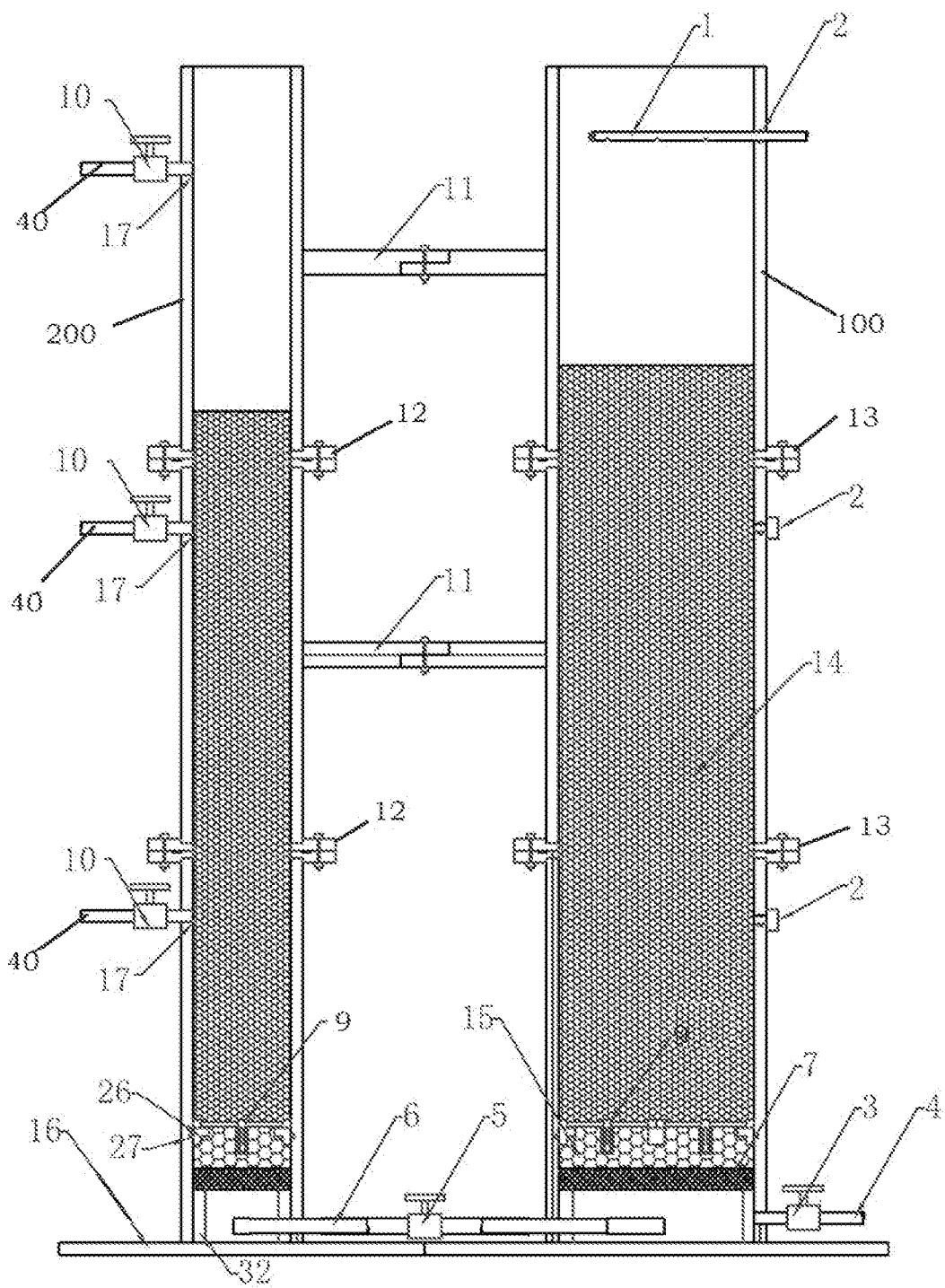
FIG. 1 is a schematic view of the double-tank oxidation pond for evaluating catalytic ozonation efficiency according to the present invention.
Figure 2:
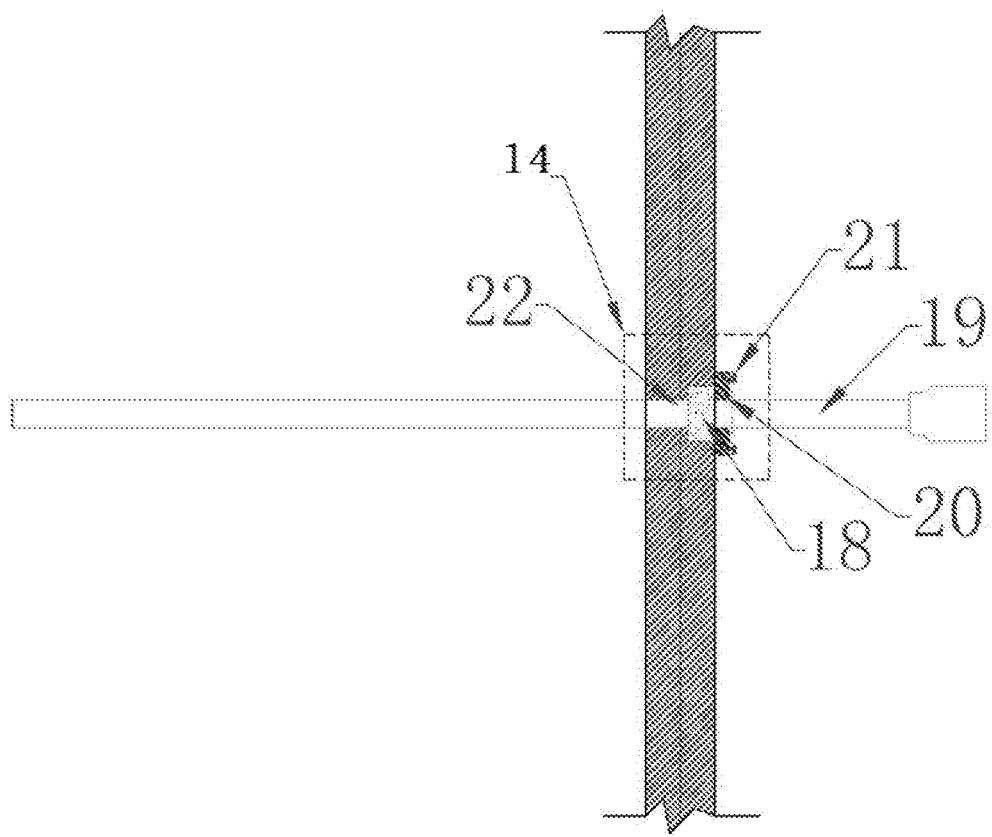
FIG. 2 is a schematic view showing the connection of the sampling hole and the sampling needle according to the present invention.
Figure 3:
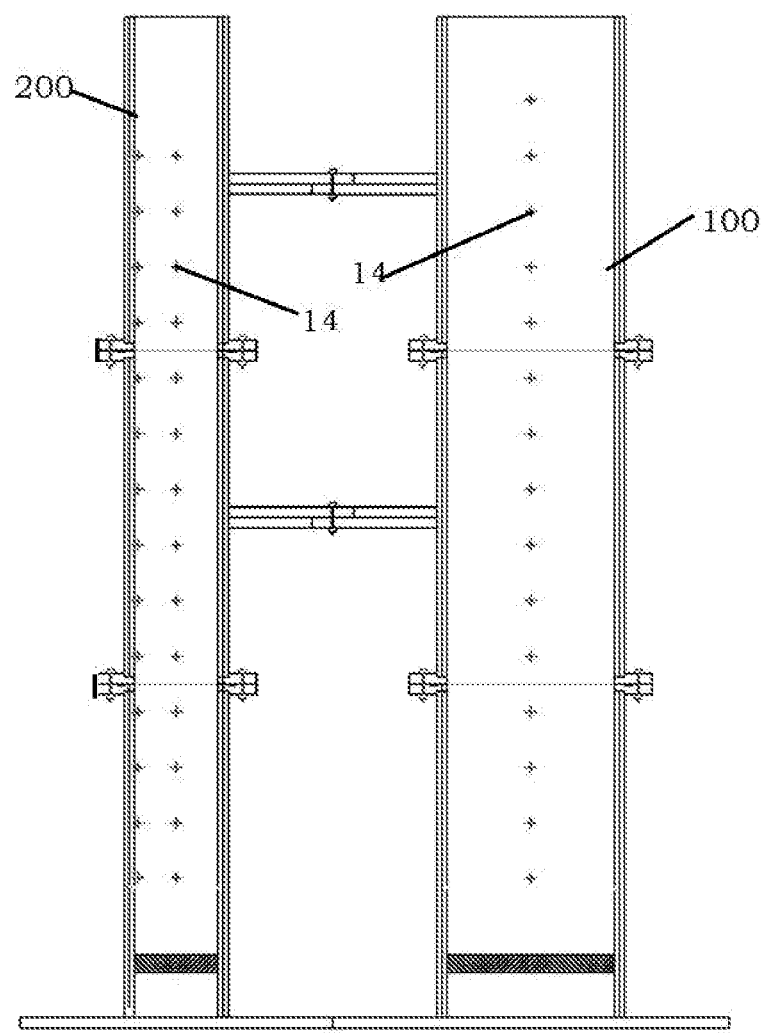
FIG. 3 shows the distribution of the sampling holes in the middle portion of the front face of the tank body A and in the left edge and the middle portion of the front face of the tank body B according to the present invention.
Figure 4:
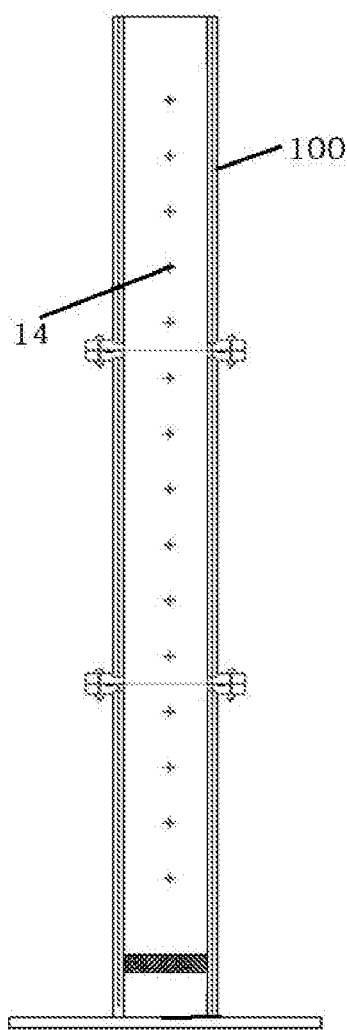
FIG. 4 shows the distribution of the sampling holes in the middle portion of the side face of the tank body A according to the present invention.
Figure 5:
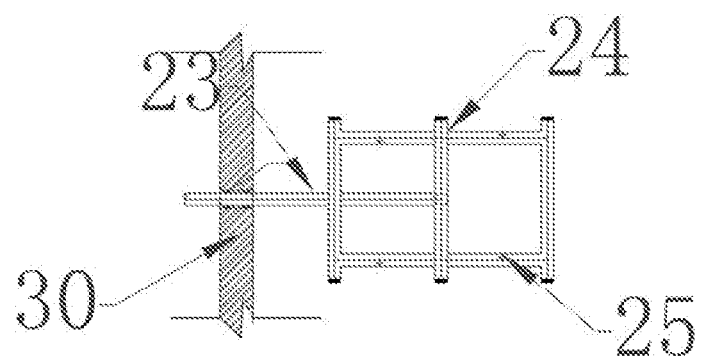
FIG. 5 is a schematic view of the ozone aeration pipe according to the present invention.
Figure 6:
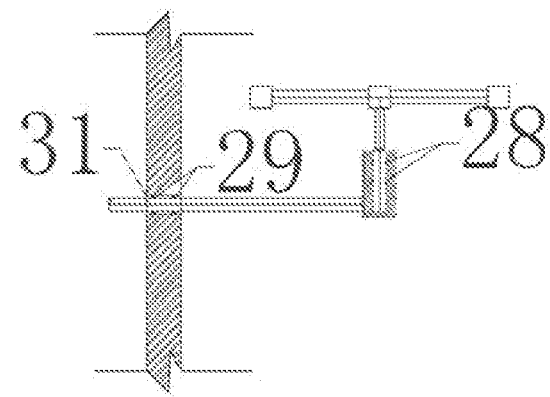
FIG. 6 is a schematic view of the installation position of the ozone aeration pipes according to the present invention.
Figure 7:
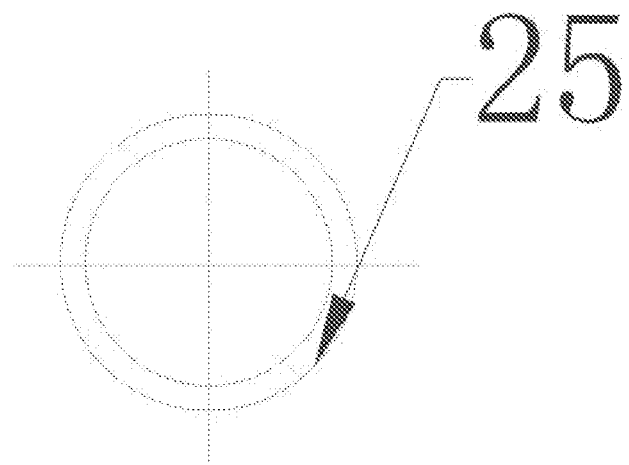
FIG. 7 is a schematic view of the aeration hole according to the present invention.
Figure 8:
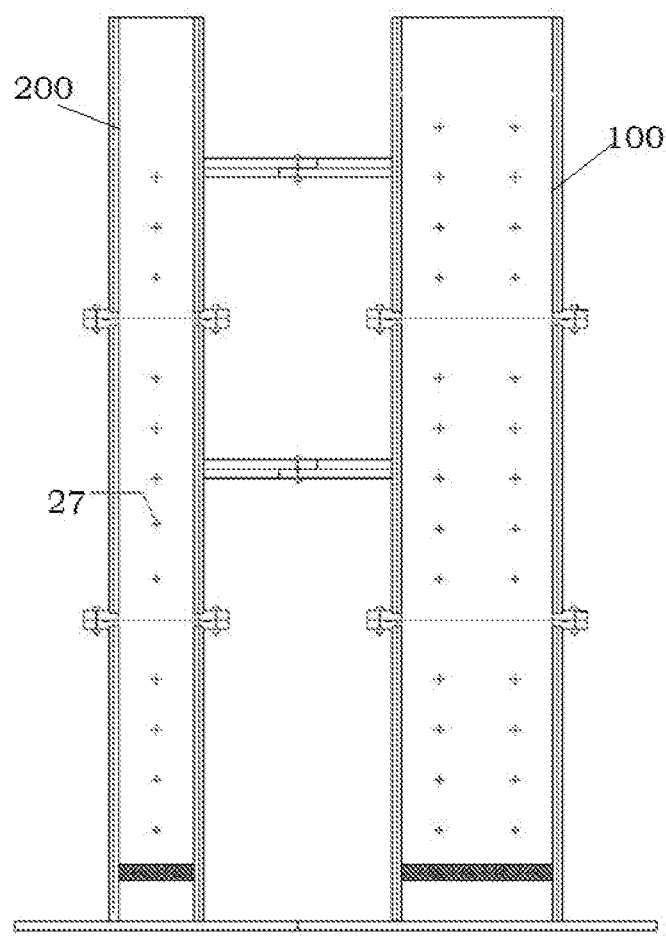
FIG. 8 shows the distribution of the screw holes on the tank body A and the tank body B according to the present invention.
Figure 9:
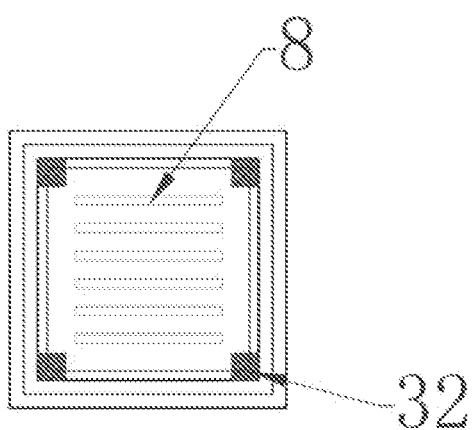
FIG. 9 is a schematic view of the filler supported overflow sieve plate according to the present invention.

The invention will be further illustrated in more detail with reference to the accompanying drawings and embodiments. It is noted that, the following embodiments only are intended for purposes of illustration, but are not intended to limit the scope of the present invention.

Example: A double-tank oxidation pond for evaluating catalytic ozonation efficiency comprises a tank body A 100 and a tank body B 200, a base 16, water inlets 2, water inlet pipes 1, water outlets 17, water outlet pipes 40, sampling needles 19, ozone aeration pipes 9 and a communication pipe 6. The tank body A and the tank body B are independent from each other, they are fixed and spaced on the base side by side. The water inlets are provided on the tank body A, and the water inlet pipes are detachably connected to the water inlets. The water outlets are provided on the tank body B, and the water outlet pipes are connected to the water outlets. The tank body A and the tank body B both are provided with sampling holes 14, the sampling needles are removably plugged to the sampling holes. Gas inlet pipe openings 31 are opened on walls of the tank body A and the tank body B respectively, ozone aeration pipes are detachably inserted to the gas inlet pipe openings. A communication pipe is connected between the tank body A and the tank body B, and the tank body A and the tank body B are respectively provided with a filler supported overflow sieve plate 7 at inner lower ends thereof.

The tank body A is formed by connecting three tank body sections in the vertical direction by a first flange 13, and the tank body B is formed by connecting three tank body sections in the vertical direction by a second flange 12. The tank body A has a cross-sectional area as twice as that of the tank body B, the tank body A and the tank body B has the same height and are connected by an upper beam 11 and a lower beam 11.

The tank body A and the tank body B are both made of organic glass, and a drain pipe 4 having a first valve 3 is provided at the bottom of the tank body.

Three water inlets are distributed at the upper, middle and lower parts of the tank body A and spaced apart from each other Three water outlets are distributed at the upper, middle and lower parts of the tank body B and spaced from each other. The water outlet pipe is provided with a second valve 10 thereon. The water inlet is easy to disassembly, and thus the position and the type of the water inlet pipe can be adjusted conveniently. The water inlet can be used alone or in combination with the unused water inlet being blocked by a silicone plug.

The sampling holes on the tank body A are evenly spaced and distributed on the middle portions of the front face and the side face of the tank body A from bottom to top, and 15 sampling holes are respectively positioned on the front face and the side face of the tank body A from bottom to top with an interval of 80 mm between every two of them, and the lowermost sampling hole is 201.4 mm away from the bottom of the tank body A. The sampling holes on the tank body B are evenly spaced and distributed on the left edge and the middle portion of the front face of the tank body B from bottom to top, and 14 sampling holes are respectively positioned on the left edge and the middle portion of the front face from bottom to top with an interval of 80 mm between every two of them, and the lowermost sampling hole is 201.4 mm away from the bottom of the tank body B.

The sampling hole consists of a stepped round hole 22, a silicone ball 18 with a pinhole and a third flange 20. The silicone ball with a pinhole is placed on the stepped round hole and is pressed by the third flange. By adjusting the tightness of the screw 21 of the third flange, it is ensured that the sampling needle can enter the sampling hole and no leakage occurs after pulling out of the sampling needle. The needle length of the sampling needle is 200 mm, which ensures that the sampling can be performed at different depths on the cross-sections of the tank body A and tank body B.

The ozone aeration pipe is supported by four supporting blocks 26, each supporting block is fixedly connected to a screw hole 27 in the tank body via a screw. The screw holes are provided in 13 layers and 8 holes on each layer for the tank body A, with each layer spaced by a distance of 80 mm and the bottom layer is 160 mm away from the bottom of the tank. The screw holes are provided in 12 layers and 4 holes on each layer for the tank body B, with each layer spaced by a distance of 80 mm and the bottom layer is 160 mm away from the bottom of the tank. The ozone aeration pipe can be conveniently installed in the screw holes via the supporting blocks, there are, at least three, ozone aeration pipes provided at different heights.

The ozone aeration pipe includes a gas intake manifold 23 and five branch pipes 24, the gas intake manifold is removably inserted in the gas inlet pipe opening, the gas intake manifold and the gas inlet pipe opening are sealed by a first O-ring 29, and the five branch pipes are connected to each other in a shape of the Chinese character "日". One of the five branch pipes is connected to the gas intake manifold and sealed at the connection position by a second O-ring 28, and the five branch pipes have at least four aeration holes 25 which are oriented downwards and at an angle of 45° to the vertical direction. The aeration holes can be configured as towards the left or right direction.

The communication pipe is connected between the bottoms of the tank body A and the tank body B, and is provided with a third valve 5.

The filler supported overflow sieve plates have elongated slots 8 thereon, and each filler supported overflow sieve plate is supported in the tank body A and the tank body B by uprights 32 at the four corners thereof.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A double-tank oxidation reactor for evaluating catalytic ozonation efficiency, comprising:
   a base;
   a tank body A and a tank body B which are independently fixed and spaced side by side on the base, wherein sampling holes are opened on the tank body A and the tank body B respectively, and gas inlet pipe openings are opened on a wall of each of the tank body A and the tank body B;
   water inlets provided on the tank body A;
   water inlet pipes, which are detachably connected to the water inlets;
   water outlets provided on the tank body B;
   water outlet pipes connected to the water outlets;
   sampling needles, which are removably plugged to the sampling holes;
   ozone aeration pipes, which are detachably inserted to the gas inlet pipe openings; and
   a communication pipe connected between the tank body A and the tank body B;
   wherein each of the tank body A and the tank body B is provided with a filler supported overflow sieve plate at an inner lower end thereof.

2. The double-tank oxidation reactor for evaluating catalytic ozonation efficiency according to claim 1, wherein the tank body A is formed by connecting three tank body sections in the vertical direction by a first flange, the tank body B is formed by connecting three tank body sections in the vertical direction by a second flange, the tank body A has a cross-sectional area as twice as that of the tank body B, the tank body A and the tank body B has the same height and are connected by an upper beam and a lower beam.

3. The double-tank oxidation reactor for evaluating catalytic ozonation efficiency according to claim 1, wherein the tank body A and the tank body B are both made of organic glass, and a drain pipe having a first valve is provided at the bottom of the tank body A.

4. A double-tank oxidation reactor for evaluating catalytic ozonation efficiency according to claim 1, wherein three water inlets are distributed and spaced on the upper, middle and lower parts of the tank body A, and three water outlets are distributed and spaced on the upper, middle and lower parts of the tank body B, and the water outlet pipe is provided with a second valve.

5. The double-tank oxidation reactor for evaluating catalytic ozonation efficiency according to claim 1, wherein the sampling holes on the tank body A are evenly distributed and spaced on the middle portions of the front face and the side face of the tank body A from bottom to top, and the sampling holes on the tank body B are evenly distributed and spaced on the left edge and the middle portion of the front face of the tank body B from bottom to top.

6. The double-tank oxidation reactor for evaluating catalytic ozonation efficiency according to claim 5, wherein the sampling hole comprises a stepped round holes, a silicone ball with a pinhole and a third flange; the silicone ball with a pinhole is placed on the stepped round hole and is pressed by the third flange.

7. The double-tank oxidation reactor for evaluating catalytic ozonation efficiency according to claim 1, wherein the ozone aeration pipe is supported by four supporting blocks, each supporting block is fixedly connected to a screw hole in the tank body via a screw.

8. The double-tank oxidation reactor for evaluating catalytic ozonation efficiency according to claim 1, wherein the ozone aeration pipe comprises an gas intake manifold and five branch pipes, the gas intake manifold is detachably inserted in the gas inlet pipe opening, the gas intake manifold and the gas inlet pipe opening are sealed by a first O-ring, and the five branch pipes are connected to each other in a shape of the Chinese character " H", wherein one of the five branch pipes is connected to the gas intake manifold and sealed by a second O-ring, and the five branch pipes have at least four aeration holes which are oriented downwards and at an angle of 45° to the vertical direction.

9. The double-tank oxidation reactor for evaluating catalytic ozonation efficiency according to claim 1, wherein the communication pipe is connected between the bottoms of the tank body A and the tank body B and is provided with a third valve.

10. The double-tank oxidation reactor for evaluating catalytic ozonation efficiency according to claim 1, wherein the filler supported overflow sieve plate has elongated slots thereon, and each filler supported overflow sieve plate is supported in the tank body A and the tank body B by uprights at the four corners thereof.

* * * * *